United States Patent [19]

Iwata

[11] Patent Number: 4,972,280

[45] Date of Patent: Nov. 20, 1990

[54] SUPPORT CONSTRUCTION FOR THE TRANSDUCER OF A MAGNETIC HEAD ASSEMBLY

[75] Inventor: Yuji Iwata, Kanagawa, Japan

[73] Assignee: Mitsubishi Denki Kabushiki Kaisha, Tokyo, Japan

[21] Appl. No.: 312,633

[22] Filed: Feb. 17, 1989

[30] Foreign Application Priority Data

Feb. 19, 1988 [JP] Japan ................................. 63-37059

[51] Int. Cl.⁵ ............................................. G11B 5/58
[52] U.S. Cl. ................................. 360/104; 360/103; 360/75
[58] Field of Search ................. 360/104, 103, 102, 75, 360/105, 106, 109, 107, 108

[56] References Cited

U.S. PATENT DOCUMENTS

| | | | |
|---|---|---|---|
| 4,167,765 | 9/1979 | Watrous | 360/103 |
| 4,542,429 | 9/1985 | Nishida et al. | 360/75 |
| 4,630,158 | 12/1986 | Spash | 360/103 |
| 4,700,250 | 10/1987 | Kunjawa | 360/104 |
| 4,724,500 | 2/1988 | Dalziel | 360/103 X |
| 4,797,763 | 1/1989 | Levy et al. | 360/104 X |
| 4,809,104 | 2/1989 | Knudsen et al. | 360/104 |
| 4,819,094 | 4/1989 | Oberg | 360/104 |

FOREIGN PATENT DOCUMENTS

| | | | |
|---|---|---|---|
| 54-25716 | 2/1979 | Japan | 360/104 |
| 59-191177 | 11/1984 | Japan | 360/104 |
| 62-205567 | 9/1987 | Japan | 360/104 |
| 63-53751 | 3/1988 | Japan | 360/04 |
| 63-281282 | 11/1988 | Japan | 360/104 |
| 1-17276 | 1/1989 | Japan | 360/104 |

OTHER PUBLICATIONS

IBM Technical Disclosure Bulletin, vol. 18, No. 11, Apr. 1976, pp. 3813-3814, "Low-Loud Beam Suspension for Mag. Heads", by Watrus.

Primary Examiner—Stuart N. Hecker
Assistant Examiner—Alfonso Garcia
Attorney, Agent, or Firm—Wolf, Greenfield & Sacks

[57] ABSTRACT

A magnetic head assembly within a transducer is caused to float over the recording surface of a medium during operation while being in contact with the surface in the non-operational state. The transducer is supported by a load beam via a flexible member which deforms under the influence of frictional force between the transducer and the surface during landings and take-off. The load beam has integral stop plates which abut against a part of the transducer to regulate the deformation of the flexible member so that it stays within a predetermined range in the event of any relatively high frictional force being applied to the transducer.

3 Claims, 2 Drawing Sheets

SUPPORT CONSTRUCTION FOR THE TRANSDUCER OF A MAGNETIC HEAD ASSEMBLY

TECHNICAL FIELD:

This invention relates to a magnetic head assembly with a transducer which performs non-contact magnetic retrieval and recording of data (i.e., read/write operations) in such a manner as to float above a magnetic record medium during the operation thereof and to be in physical contact with the medium when the apparatus is not operating.

BACKGROUND ART

Referring to FIGS. 4 and 5 while respectively show a plan view and a side view of a conventional assembly of the above-described type when in its non-operational mode, reference numeral 1 denotes a transducer for conducting a non-contact read/write operations, numeral 2 denotes a flexible member adhered to the transducer 1, numeral 3 denotes a load beam supporting the flexible member 2, and numeral 4 denotes a mounting block for securing the load beam 3. The transducer 1 is placed on a stationary magnetic disk (medium) with a certain amount of load applied by the load beam 3 via a centrally located dimple of the member 2 attached to the transducer 1.

In operation, during initial rotation of the medium, a frictional force occurs between the medium and the transducer 1, which causes elastic deformation of the flexible member 2 which supports the transducer 1 in opposition to the frictional force. Once rotation of the medium has attained sufficient speed, the transducer 1 is caused to take off from the disk and then floats on an air layer over the recording surface of the medium. The transducer 1 floats in a stable manner due to the function of the member 2. While floating on the cushion of air, the transducer is subjected by the load beam 3 to a certain load via the dimple and performs non-contact magnetic retrieval and recording of data with a constant distance being kept between the transducer and the medium.

The conventional magnetic head assembly described above requires that the frictional force between the transducer and the medium be restricted to as low a level as possible. Any frictional force above a certain level would cause permanent deformation of the flexible member 2 or damage the surface of the medium due to it being hit by the transducer with considerable impact.

SUMMARY OF THE INVENTION

It is an object of this invention to provide a magnetic head assembly which does not suffer permanent deformation of the flexible member in the event of a relatively high frictional force being applied to the transducer, and which enables every take-off and touchdown of the transducer to be successfully effected without causing any damage to the surface of the medium.

A magnetic head assembly in accordance with this invention comprises a mounting block serving as a constructional foundation, a load beam having a free end and being secured to the mounting block at the end opposite to the free end, a transducer for performing non-contact magnetic retrieval and recording of data while floating over the recording surface of a medium, being in physical contact with the medium in the non-operational state, and a flexible member disposed between the transducer and the free end of the load beam and arranged enable the transducer to be attached to the free end. The flexible member elastically deforms to absorb the frictional force occuring between the transducer and the medium during landing and take-off. The transducer has wall means and the load beam has at its free end stop means which are usually out of contact with the wall means with a small present between them. The stop means of the load beam abuts against the wall means of the transducer to regulate the deformation of the flexible member in the event of any relatively high frictional force being applied to the transducer.

BRIEF DESCRIPTION OF THE DRAWINGS

Embodiments of the invention will now be described, by way of examples, with reference to the accompanying drawings, in which.

DETAILED DESCRIPTION OF THE PREFERRED EMBODIMENTS

Figure 1:
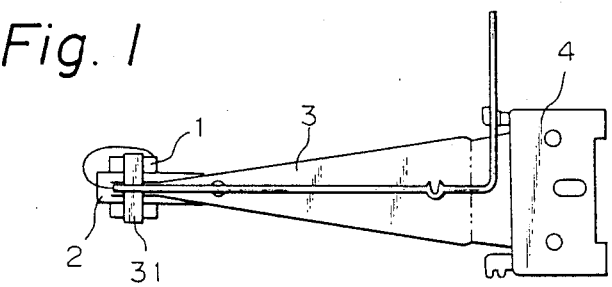
FIG. 1 is a plan view showing an embodiment of a magnetic head assembly according to this invention.
Figure 2:
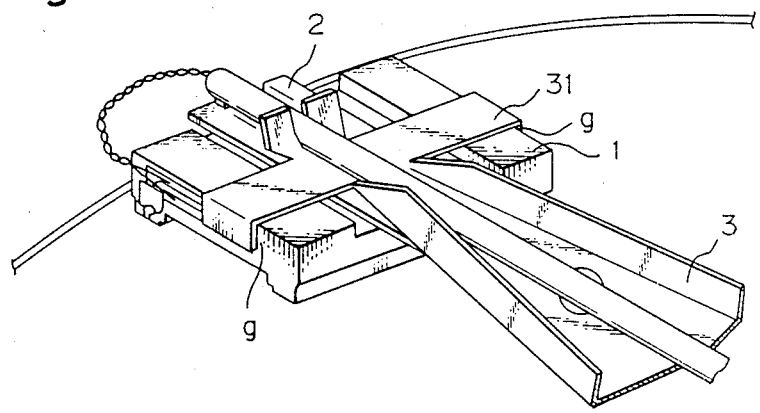
FIG. 2 is a perspective view showing the same embodiment.

Referring to FIGS. 1 and 2 showing an embodiment of this invention, a load beam 3 has at its free end a pair of L-shaped stop plates 31 integral therewith and extending therefrom in opposite directions. More particularly, the pair of stop plates 31 horizontally extend in opposite directions perpendicular to the load beam from the point of the load beam at which a certain load is applied to the dimple. Each plate has an orthogonally angled end portion which is juxtaposed with the side wall of the transducer in such a way as to leave only a gap g and terminates half way up the transducer.

While the medium is stationary the transducer 1 is in contact with the medium, with a certain load applied thereto. At the beginning of the rotation of the medium, the transducer 1 is urged in the rotational direction with a frictional force that depends on circumferential conditions such as the coarseness of the surface of the medium, the existence of any lubricant, and the like. As long as the frictional force is within a certain tolerance, the flexible member 2 is subjected to elastic deformation which is proportional to the frictional force, yet is within the dimension of the gap g. In the event of a higher frictional force being applied than the given tolerance allows for, the member 2 is so urged that the side wall of the transducer 1 abuts against the angled end portion of the stop plate 31 which is integral with the load beam 3. The end portion regulates the deformation of the member 2 to keep it within the dimension of the gap g by virtue of the high rigidity of the load beam 3, thereby preventing any permanent deformation of the member 2 or damage to the medium due to it to being hit by the transducer. As the transducer 1 starts to take off from the medium, the frictional force applied to the transducer decreases and the transducer moves away from the end portion of the stop plate 31. After completion of take-off, the transducer 1 floats above the medium in a stable state by virtue of the function of the flexible member 2 with the gap g being kept between the end portions and the corresponding side walls of the transducer.

Upon touchdown of the transducer 1 on the medium which is at that stage on the verge of becoming stationary, the stop plates 31 function in the same way as that described above to prevent any permanent deformation of the member 2 or damage to the medium.

As has been described above, with the simple arrangement of having the L-shaped stop plates 31 at the free end of the load beam 3 with its end portions in juxtaposition with the side walls of the transducer 1, the magnetic head assembly according to the above embodiment will never suffer from damage to the surface of the medium or the permanent deformation of the flexible member 2, which makes a significant contribution to improving reliability without raising production costs to any substantial extent.

Figure 3:
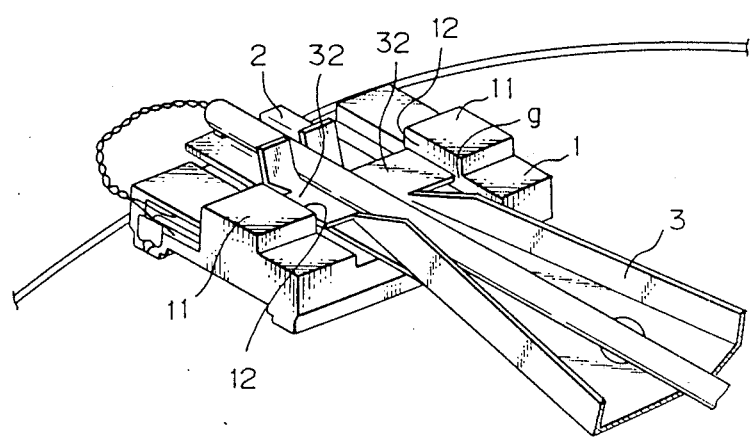
FIG. 3 is a perspective view showing another embodiment of this invention.
Figure 4:
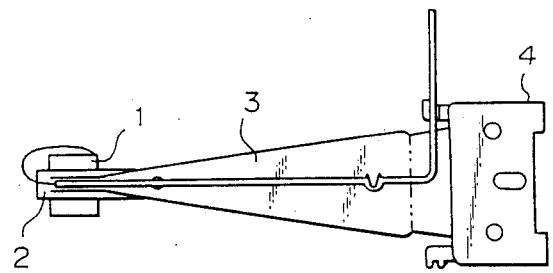
FIG. 4 is a plan view showing a conventional type of magnetic head assembly.
Figure 5:
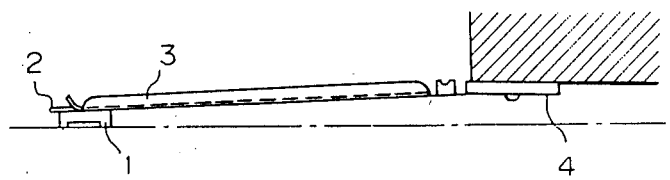
FIG. 5 is a side view showing the conventional assembly.

Reference is now made to FIG. 3 which shows an alternative embodiment of this invention. The transducer 1 has a pair of protruding portions 11 on opposite sides of the free end of the load beam 3 with walls 12 facing each other in such a manner as to cross the load beam 3 at a right angle. The load beam 3 has at its free end a pair of stop plates 32 extending in opposite directions perpendicular to the load beam and each of those stop plates 32 terminates close to the corresponding wall 12 so as to leave only a gap g.

The end of the plate 32 abuts against the wall 12 to regulate the deformation of the flexible member 2 in the event of any relatively high frictional force being applied to the transducer 1, as in the first embodiment. This prevents the occurrence of any damage to the surface of the medium or permanent deformation of the flexible member.

What is claimed is:

1. In a magnetic head assembly which comprises a mounting block serving as a constructional foundation, a load beam having a free end and being secured to said mounting block at the end opposite to said free end, a transducer for performing non-contact magnetic retrieval and recording of data while floating over the recording surface of a medium during operation, being in physical contact with the medium in a non-operational state, and a flexible member disposed between said transducer and said free end of said load beam and arranged to attach said transducer to said free end, said flexible member being adapted to elastically deform so as to absorb the frictional force between said transducer and said medium during touchdown and take-off thereof, said assembly characterized in that said transducer has separately disposed wall means and the load beam has at said free end stop means extending therefrom in opposite directions perpendicular to said load beam and respectively having an end portion which is so disposed that there is defined a respective gap between each said end portion of said stop means and one of said wall means, said stop means and wall means disposed in relative interpositional relationship so that said gap extends in a direction therebetween that is substantially in parallel with the plane of said recording surface, said gap being less than the limit of elastic deformation of said flexible member, said end portions of said stop means abutting against respective wall means to regulate the deformation of the flexible member so as to be kept within the limit of an elastic deformation thereof in the event of relatively high frictional force being imposed upon said transducer by said medium.

2. An assembly as recited in claim 1, wherein said wall means are outer facing side walls of the transducer, the stop means is a pair of L-shaped plates, and the orthogonally angled portion of each of said L-shaped plates defines said end portion which is juxtaposed with said outer facing side wall of said transducer.

3. An assembly as recited in claim 1, wherein said transducer has a pair of protruding portions extending at a point from a normally raised wall of said transducer to be disposed on opposite sides of said free end of said load beam with side walls of said protruding portions defining said wall means and facing inward toward each other, and said stop means is a pair of plates, the free end of each of said plate defining said end portion.

* * * * *